United States Patent
Heyman et al.

(10) Patent No.: US 9,639,832 B2
(45) Date of Patent: *May 2, 2017

(54) SOFTWARE LICENSE SERVING IN A MASSIVELY PARALLEL PROCESSING ENVIRONMENT

(75) Inventors: Jerrold M. Heyman, Raleigh, NC (US); Michael L. Nelson, Raleigh, NC (US); Andrew G. Tonkin, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 834 days.

This patent is subject to a terminal disclaimer.

(21) Appl. No.: 13/427,980

(22) Filed: Mar. 23, 2012

(65) Prior Publication Data
US 2012/0192285 A1  Jul. 26, 2012

Related U.S. Application Data

(63) Continuation of application No. 12/788,926, filed on May 27, 2010.

(51) Int. Cl.
*G06F 21/00* (2013.01)
*G06Q 20/12* (2012.01)
*G06F 21/10* (2013.01)

(52) U.S. Cl.
CPC ......... *G06Q 20/1235* (2013.01); *G06F 21/10* (2013.01)

(58) Field of Classification Search
USPC .......................................................... 705/59
See application file for complete search history.

(56) References Cited

U.S. PATENT DOCUMENTS

| | | | | |
|---|---|---|---|---|
| 4,924,378 A | * | 5/1990 | Hershey et al. | 726/29 |
| 5,138,712 A | | 8/1992 | Corbin, Jr. | |
| 5,204,897 A | * | 4/1993 | Wyman | 710/200 |
| 5,935,249 A | * | 8/1999 | Stern et al. | 726/21 |

(Continued)

OTHER PUBLICATIONS

Dalheimer-et al.; "GenLM: License Management for Grid and Cloud Computing Environments"; ACM Digital Library/IEEE; pp. 132-142; 2009.

(Continued)

*Primary Examiner* — Zeshan Qayyum
(74) *Attorney, Agent, or Firm* — Walter W. Duft (57) ABSTRACT

Techniques for implementing software licensing in a massive parallel processing environment on the basis of the actual use of licensed software instances are disclosed. In one embodiment, rather than using a license server or a node-locked license strategy, each use of a licensed software instance is monitored and correlated with a token. A store of tokens is maintained within the licensing system and a token is consumed after each instance successfully executes. Further, a disclosed embodiment also allows jobs that execute multiple software instances to complete execution, even if an adequate number of tokens does not exist for each remaining software instance. Once the license tokens are repurchased and replenished, any overage consumed from previous job executions may be reconciled. In this way, token-based licensing can be adapted to large scale computing environments that execute jobs of large and unpredictable sizes, while the cancellation of executing jobs may be avoided.

6 Claims, 4 Drawing Sheets

(56) References Cited

U.S. PATENT DOCUMENTS

| | | |
|---|---|---|
| 6,502,079 B1 | 12/2002 | Ball et al. |
| 7,013,294 B1* | 3/2006 | Sekigawa et al. ............. 705/59 |
| 7,536,356 B2 | 5/2009 | Eng |
| 2005/0108095 A1* | 5/2005 | Perlmutter ...................... 705/14 |
| 2006/0294019 A1 | 12/2006 | Dayan et al. |
| 2007/0226150 A1 | 9/2007 | Pietrzak et al. |
| 2007/0261105 A1 | 11/2007 | Drath et al. |
| 2008/0005032 A1* | 1/2008 | Znidarsic ............. G06F 21/105 705/59 |
| 2008/0235805 A1 | 9/2008 | Pfitzmann et al. |
| 2009/0119218 A1 | 5/2009 | Ooki |

OTHER PUBLICATIONS

Corbin-et al.; "Apparatus and Method for Licensing Software on a Network of Computers"; Dialog/CSA; 2008.

Cris Wendt; Expiring Concurrent Tokens; Consumptive Tokens, Entitlement and Compliance Management; Jul. 29, 2009, 3 pages http://blogs.flexerasoftware.com/ecm/2009/07/more-on-token-based-license-models.html.

Chris Kanaracus, "Vendor Pushes 'token-Based' Licensing Model," 6 pages, Sep. 19, 2008; CIO.com: http://www.cio.com/article/450191/Vendor_Pushes_token_Based_Licensing_Model.

* cited by examiner

Fig. 4

SOFTWARE LICENSE SERVING IN A MASSIVELY PARALLEL PROCESSING ENVIRONMENT

This application is a continuation under 35 U.S.C. 120 of application Ser. No. 12/788,926, filed May 27, 2010, entitled "Software License Serving In A Massively Parallel Processing Environment".

FIELD OF THE INVENTION

The present invention generally relates to software licensing techniques used in computer systems. The present invention more specifically relates to techniques for serving and tracking the use of software licenses for a plurality of processing CPUs and cores in large-scale computing environments, such as massively parallel processing computer systems.

BACKGROUND OF THE INVENTION

A wide variety of computer software programs implement licensing restrictions to limit the number of instances of the program that may be executed by a user or computer. Licensing restrictions are most typically implemented to obtain licensing fees and revenue for additional software executions on more than one workstation. Many different licensing enforcement mechanisms exist in software applications, but these mechanisms generally fall within two distinct licensing models.

The first model is the nodelock concept, where the software is restricted to a specific machine for execution—which is generally determined at installation time. An additional restriction on a nodelock license may be how many instances of the program can be executed simultaneously. This often requires techniques that tie the license to some particular hardware or software configuration, thus preventing the software instance from being executed elsewhere. This model is typically limited to single-instance software applications that operate exclusively on only one computing system.

The second model is the floating (or network) concept, where a specific number of licenses are purchased, and the application contacts a license manager or other key server to determine if the user can obtain a license to execute it. Floating licenses are not entirely unrestricted, but they may be adapted to much larger processing environments. For example, floating licenses might be restricted by the total number of licenses available, userids that can execute the software, or IP Address ranges where the software is capable of running.

In a massively parallel processing (MPP) environment (such as is embodied by many "supercomputer" systems), applications are generally submitted via a scheduler and may run on many CPUs. For example, the application may execute using a few CPUs while testing, then tens of CPUs on one run, hundreds of CPUs the next time, and thousands of CPUs the next time, depending on the particular job being executed. In large MPP installations, it is impractical (for obvious cost reasons) to use nodelock licensing, as each CPU in the MPP machine would have to be licensed, or applications would need to be restricted to a subset of CPUs where they could be executed. Based on the varying complexity of jobs, this is not a realistic restriction. Further, with a floating license model, there is the necessity that the application be able to contact the license server from each instance where it is running In the situation where there are multiple compute elements (cores or CPUs) on a node, all using the same IP address, a network/floating license would have to license each compute element on the node.

Many MPP configurations keep individual CPUs on a private network to avoid latency and bottlenecks that occur due to name serving and a shared LAN. Therefore, a license server may not even be able to execute on an MPP system—leaving many applications with nowhere to authenticate its use. Without the ability to authenticate a license, many software applications cannot execute.

Of course, possible workarounds to the multi-processor licensing problem include either eliminating the license restriction completely, or purchasing licenses to cover every possible CPU that might operate in the computing system. However, the up-front cost of purchasing rights to unlimited software would be orders of magnitude higher to offset the loss of per-CPU licenses. Further, many software vendors do not allow licenses to be customized or reduced in price on the basis that the computer is "more powerful" or the software runs in a multi-processor setting. Techniques are needed for effectively managing the use and distribution of software licenses in a large processing environment, such as a MPP supercomputer configuration.

BRIEF SUMMARY OF THE INVENTION

One aspect of the present invention described herein provides a licensing model that is based on a use count. In operation, the licensee would purchase a large number of tokens (i.e., license keys) that are then consumed as the application executes. Each token might represent an individual execution of the application (or some other discrete unit of work), so that after the application or unit of work has completed, the total number of available tokens is decremented.

A further aspect of the invention enables "after the fact" licensing to reconcile the number of license tokens actually consumed. This is in contrast to techniques which require licenses to be allocated by a license server prior to execution. Further, in one embodiment, after-the-fact token licensing enables software to be successfully executed in the case that more instances need to be executed than license tokens are available. In the event that an execution results in an overage and consumes all available tokens, the execution of the program will be allowed to continue. The overage would simply be recorded, so that when a new set of tokens is purchased from the license holder, the overage is subtracted from the total of new tokens installed.

The tracking and consumption of license tokens as presently described enables a traditional license server to be eliminated from an MPP premises and its system operations. Further, the techniques described herein allow license consumption and reconciliation to occur outside of the MPP environment, virtually anywhere. Thus, a vendor may monitor the consumption of licenses at its location, allowing the vendor to track and bill license usage on a micro, minute, or daily level. Moreover, the presently described techniques also facilitate license usage in conjunction with computing on demand or cloud computing where systems at multiple locations, sites, and vendors are implicated. Likewise, the presently described techniques address license usage where consumption originates out of a common pool no matter where the computing resources are located.

For most MPP configurations, the number of tokens purchased would likely be in the hundreds of thousands of tokens (or larger), because large MPP configurations may have tens of thousands of CPUs. The present invention enables licensing considerations to be much more simplified. The techniques described herein extend beyond the capabilities of mere consumptive licensing servers and allow software applications to conduct and complete operations without interruption.

In one specific embodiment of the present invention, a method for serving licenses in a computing system such as a multi-processor or multi-core environment includes maintaining a plurality of license tokens within the computer system and tracking a number of license tokens remaining for use in the computer system. Specifically, the license tokens are allowed for the execution of licensed software instances in jobs performed on the computer system, with the number of remaining license tokens tracked in a token counter. When a job that includes the execution of one or more licensed software instances is conducted on the computer system, the execution of each licensed software instance results in consumption of one license token. Accordingly, the token counter is decremented after completion of the job, the counter being decremented for each successful execution of the one or more licensed software instances.

Through use of the counter, the consumption of the license tokens may be tied to the precise number of successfully executed licensed software instances throughout the computer system, which is particularly helpful for jobs having a large or unpredictable number of software instances. The accounting of the token usage may be performed through the use of a license daemon or process that monitors for the execution of the software instance and decrements a token counter. Further embodiments also enable monitoring and alerting related to the number of available licenses or prevent a job from executing unless a specified number of tokens is available for the entire job. Additionally, as further described herein, the job may be able to complete execution even if an adequate number of token licenses is not available. In such a case, the token counter records a negative balance for the number of tokens required, and tokens are consumed and the negative balance reconciled when additional tokens are added to the system.

Other specific embodiments of the present invention provide for a massively parallel processing computing system configuration comprising a plurality of processors, a plurality of corresponding memory units, a license manager, and instructions stored within the computing system for serving and tracking licenses throughout the massively parallel computing system as described herein. Additionally, another specific embodiment of the present invention provides for a computer program product for serving licenses in a multiprocessor computer system, with the computer program product comprising a computer readable storage medium having computer readable program code embodied therewith to implement the license token serving and tracking techniques described herein.

DETAILED DESCRIPTION OF THE INVENTION

One embodiment of the present invention provides token-based licensing techniques that enable licenses to be distributed to individual CPUs or other units of processing on an as-needed basis for the execution of software. In this way, the presently-described licensing technique approaches a problem from a "royalty"-generating view, consuming licensing tokens or credits for actual CPU usage that occurs during the execution of specific tasks. Thus, a user will only need to pay for the tokens that are actually consumed by the computing system—and consume the licenses that are needed to actually execute the software on the computing system. This eliminates the need for "nodelocked" licenses, a floating license server, or other licensing strategies that are not easily adaptable to large computer processing systems.

The various embodiments of the present invention provide the ability to scale the use of license tokens to large multi-processor, multi-core, and multi-system environments without using a license server. This is in contrast to simple "consumptive token" licensing schemes, where a license server may provide licenses to CPUs or systems from a finite number of identical licenses. The techniques described herein are useful for cases where the same software instance is executed on numerous nodes, or where the executed software instances vary significantly.

For example, in a multi-processor supercomputer, millions of tokens will be necessary to execute certain software applications that are distributed throughout the MPP system. The size of jobs and the number of licenses required will vary depending on the resources available in the MPP system, the complexity of the job, and the particular software processes. At any given time, multiple software applications each with multiple instances may be executing on the MPP system. The presently described techniques simplify the task of licensing to each of these processing units, by decrementing a store of licenses over time as jobs are completed.

The present disclosure also provides techniques to adapt to cases where the scale of the job varies significantly. Thus, users will be able to purchase a set number of tokens based on their projected usage—not on the basis of concurrent uses or the maximum number of uses at any one time but instead on the basis of cumulative usage. This is particularly helpful in MPP supercomputer environments.

For example, if the application executing in a MPP supercomputer environment runs on 1 CPU the first time, then 1 token may be consumed. The next time the job is run, it is run on 100 CPUs, and 100 tokens may be consumed. The third run uses 1000 CPUs, and 1000 tokens may be consumed. The total consumed number after those three (3) runs would be 1101 tokens. This is particularly helpful for MPP execution where the nature of the job and the size of the system may vary significantly. In this example, only 1101 tokens would need to purchased, rather then nodelocked licenses for all 1000 CPUs (which would be equivalent to the purchase of at least 3000 tokens).

Another significant advantage of the techniques disclosed herein is enabling the ability to complete software executions even if the number of tokens requested in the MPP environment uses more tokens than are available. In the previous example of three distinct runs, a cumulative use of 1101 tokens works just fine if 2000 tokens had been purchased. In one embodiment, the MPP system will also be able to run jobs to completion if only 1000 tokens had been purchased, and the user would simply "owe" the license owner for 101 tokens. In one embodiment, an email (or some other user communication) is generated to notify the user and the owner about a license shortfall, or may provide alerts when license tokens are running low. Thus, the license technique may not allow additional runs using the software in question until more tokens than are currently owed are paid for by the user.

The presently described techniques are distinguishable from traditional methods of licensing tied to the number of users or computers that may simultaneously run the software. Instead, a cumulative count on how many times the software has been used is tracked and compared to the count purchased under the license. In this way, the license count is analogous to minutes in a cell phone plan—the user purchases a set amount and then adds more minutes as needed. If the user exceeds their quota of minutes, then the call is allowed to continue, with additional billing implications assessed after the call is completed. As applied to the licensing technique disclosed herein, if the number of tokens remaining is not enough to complete the currently processing job, the job will be able to continue but an overage will be noted.

Figure 1:
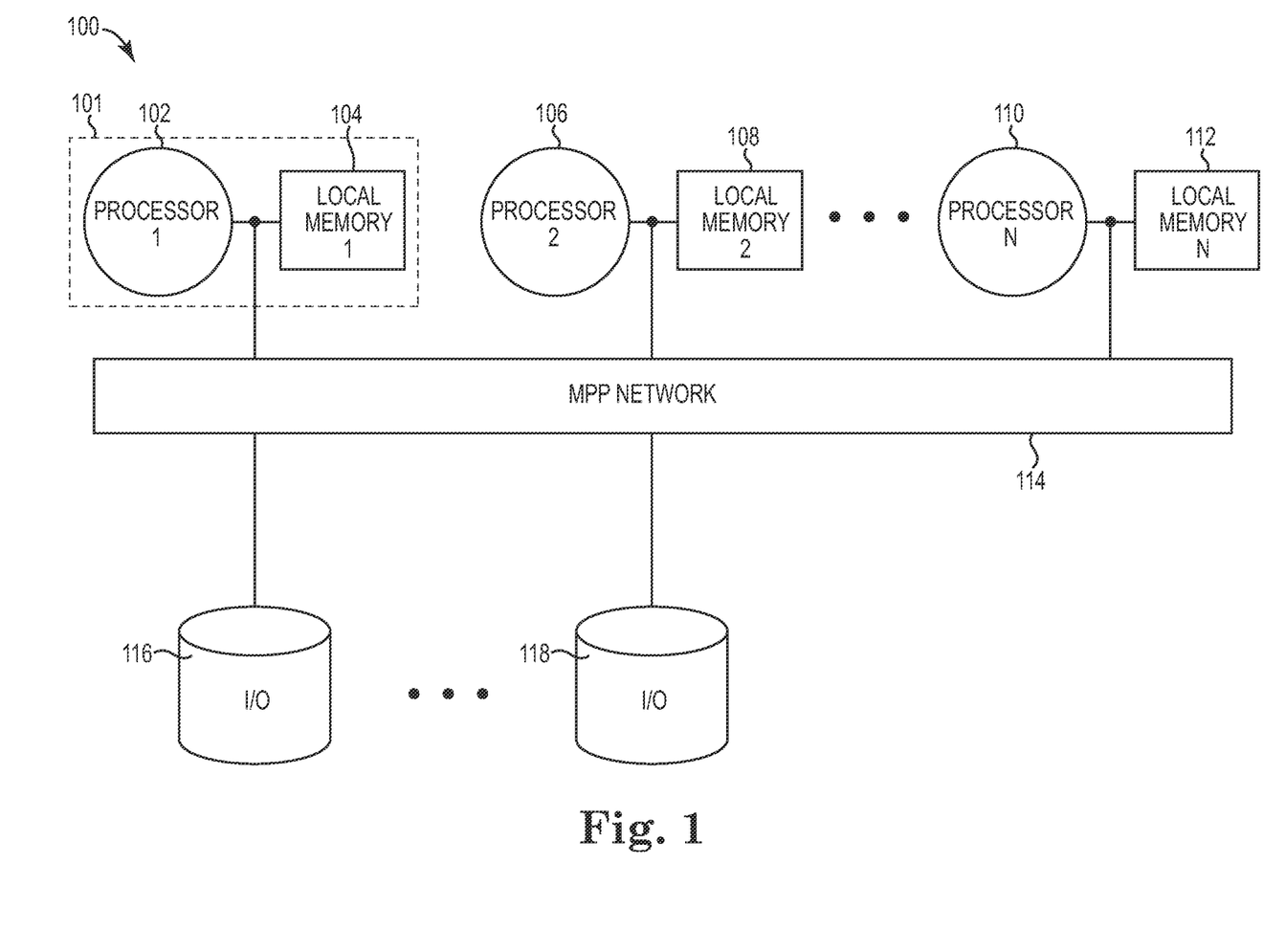
FIG. 1 provides an illustration of a MPP computer system configured to execute software instances that consume license tokens in conjunction with an embodiment of the invention.

FIG. 1 illustrates an example MPP (massively parallel processing) system 100 which may be configured to be used in conjunction with the various embodiments of the present invention. MPP system 100 may contain hundreds, thousands, or more of processing nodes such as node 101, with each node including a processor 102, connected to a local memory unit 104 and associated support circuitry (not shown). Likewise, other processors such as Processor 2 106 and Processor N 110 are connected to local memory units 108, 112. Each of these processing nodes is linked to each other via a MPP processing network 114. Further, various I/O data elements such as 116, 118 provide I/O to the various nodes in the MPP system.

As evident, the configuration of the system depicted in FIG. 1 may vary significantly. An MPP system is nominally composed of multiple nodes, where each node is connected via communications network such as InfiniBand or Ethernet, and communicates via network protocols such as TCP/IP and the like. Each node is composed of at least one computing element, which in turn is composed of one or more cores. Storage media (generally memory) is local to each node and shared among the computing element(s). These resources could be located in the same physical system, same rack, same location, or anywhere in the world as long as these criteria are met. Therefore, due to the size of typical MPP instances and jobs, the license tokens need to be of minimal cost as applications can use thousands of tokens for each run.

Figure 2:
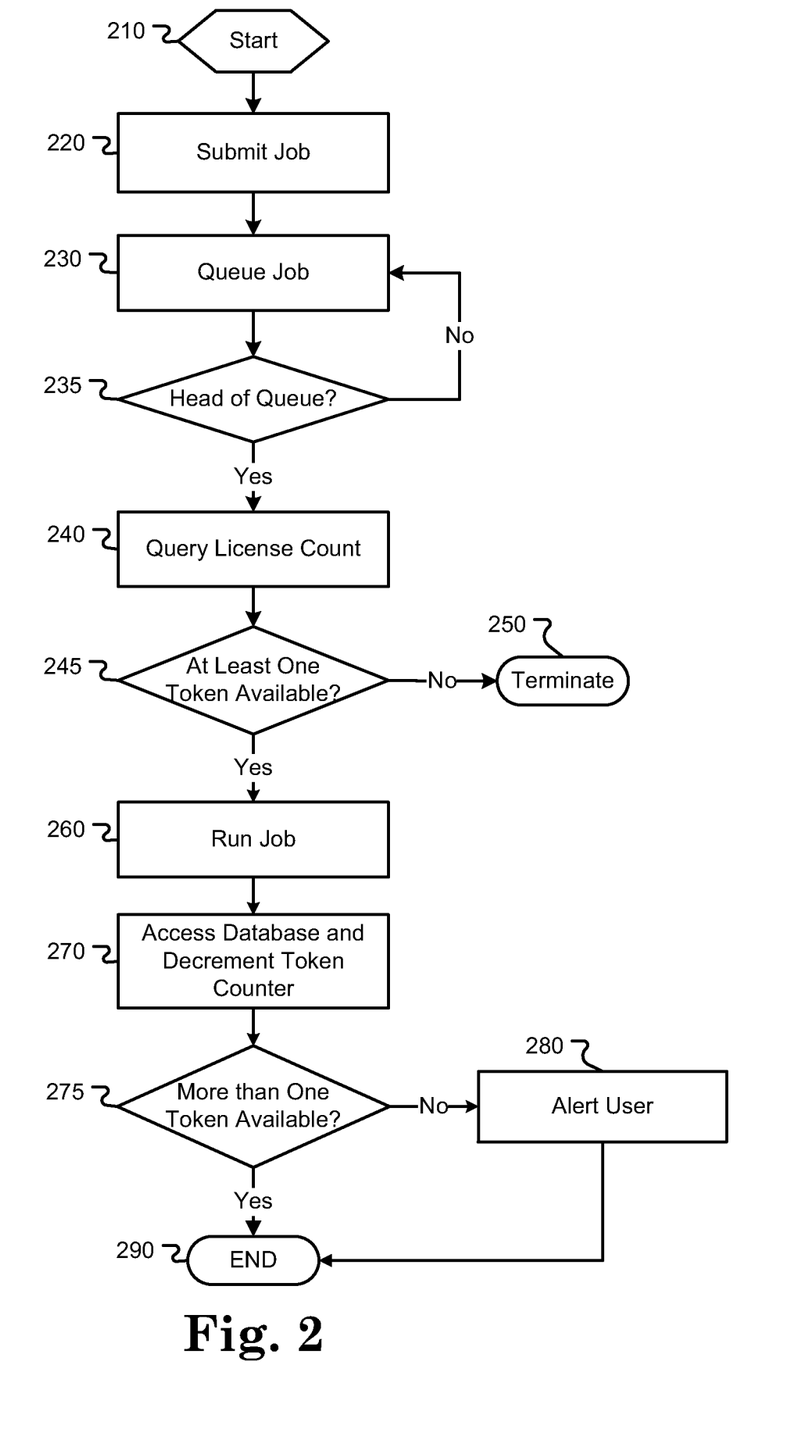
FIG. 2 is a flowchart demonstrating operation of a process configured to serve and reconcile use of token licenses according to an embodiment of the invention.

In one embodiment, licensing is managed not through a license server that doles out licenses, but instead the license usage is reconciled through an actively monitoring "license counter." FIG. 2 depicts a flowchart showing the operation of a license counter according to an embodiment of the present invention. In this example, the license counter is a process running on a node that can access the database of jobs having completed. This provides an accounting for the number of licenses that were consumed after execution of the entire job.

As shown after the start of the license counter process as in 210, the job is submitted for execution in the MPP environment as in 220 and is queued for execution as in 230. The license counter will not need to perform any action until the node moves to the head of the queue as in 235 and is ready for execution.

After the job submission reaches the head of the queue as in 235, the number of available tokens is queried as in 240, to determine if any tokens are available for execution of the job as in 245. If there is at least one available token the job submission is executed as in 260. If at no tokens are available and the job requires a license to execute, then the job is terminated as in 250. The ultimate goal with this configuration is not to kill any existing job but to prevent jobs from starting with zero licenses. If there are enough tokens to start the job then the job can finish; if there are not enough tokens to start the job, then the job will not be started. Therefore, the token based system never interrupts live processing for licensing reasons. If at least one token is available, then the execution of the job is intended to continue as normally as possible.

After a job scheduler signals that a job has completed after execution of the job as in 260, the license counter performs a query on a database containing information relevant to the most recent job run. From this query, the license counter may determine whether the job used any of the software applications that the license counter tracks. If a tracked application was used in a job, then the license counter decrements the number of available tokens by the number of nodes that the application had just successfully executed on as in 270. Finally, once the number of tokens has been decremented, then the license counter will determine if more than one token remains available for future jobs as in 280. If the supply of tokens is exhausted and would prevent the execution of additional jobs, then the user is alerted as in 280. Otherwise, the work for the license counter is complete with respect to in the execution of the job as in 290. The license counter will then proceed with additional checks on other jobs executing in the system.

Figure 3:
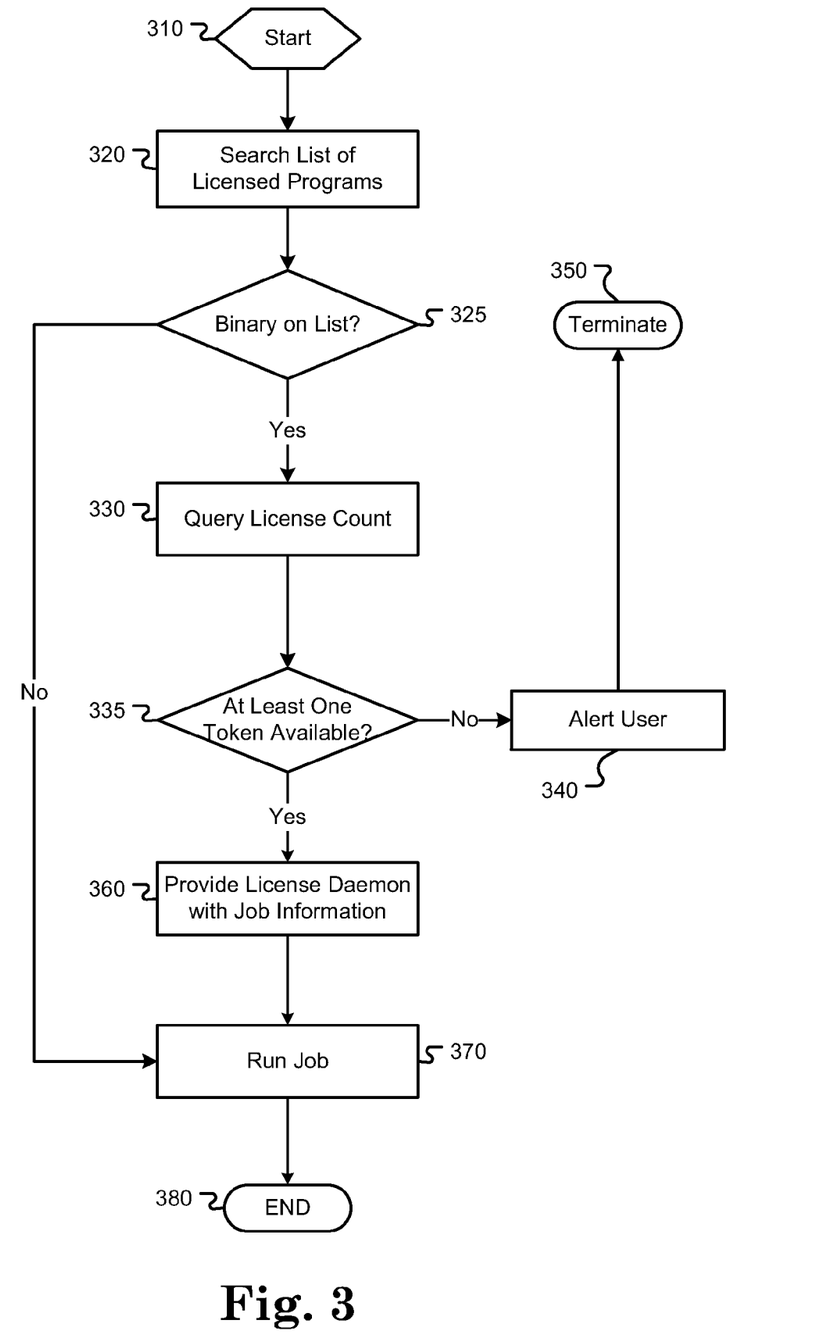
FIG. 3 is a flowchart demonstrating operation of a process configured to verify usage of software instances requiring token licenses according to an embodiment of the invention.

FIG. 3 provides an additional illustration of steps that may be used for verifying the use of a token distribution prior to execution of a job according to an embodiment of the present invention. As shown, this sequence of the license counter starts in 310 by searching a list of licensed programs as in 320. If the binary to be executed is on the list as in 330, then the license validation will proceed. If the binary to be executed does not need to obtain a license, then the licensing validation is not necessary, and the binary can execute without obtaining tokens as in 370.

Thus, in addition to alerting a user of a deficient number of tokens after a job has executed, the license count may be queried before the job is executed to prevent licensing overruns from occurring. In one embodiment, if at least one token is available as in 345 then licensing will occur; otherwise a user will be alerted as in 350 and the licensing validation terminated as in 355. The failure to obtain a token license will result in the failure to execute the job. As is evident, another operator-defined threshold or minimum number of license tokens may be enforced with use of these license counting techniques.

In a further embodiment, an executable process responsible for reconciling the number of license tokens used with a store of available licenses will be provided with binary and user information prior to execution of a job as in step 360.

This will allow the executable process to identify prior to completion of the job which jobs have software instances that will consume tokens. Finally, the license counter activities will complete after execution of submitted binary 370 and completion of the job as in 380.

Figure 4:
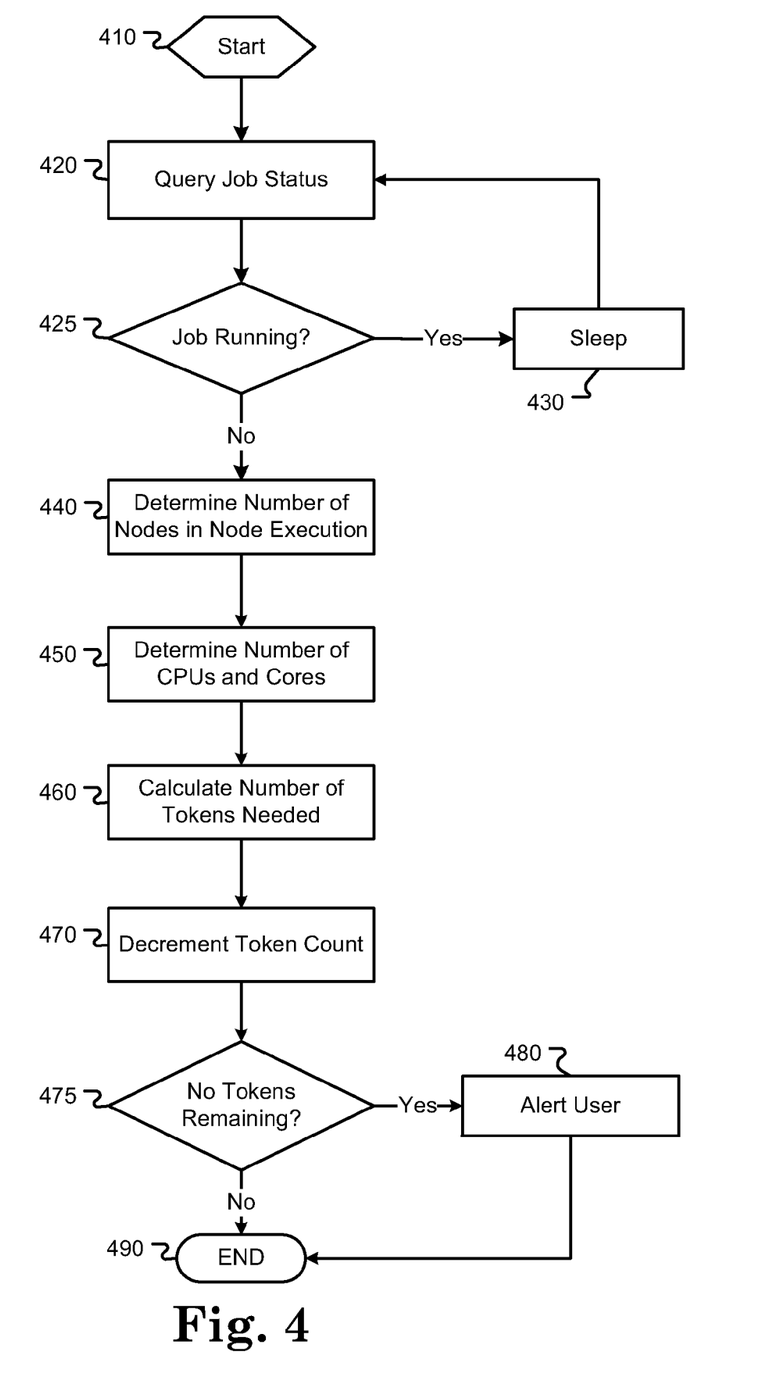
FIG. 4 is a flowchart demonstrating operation of a process calculating token usage for finished jobs according to an embodiment of the invention.

As previously suggested, a service or process may be operated within the MPP environment in order to reconcile the consumed licenses after software execution. In one embodiment, this process is conducted by a license daemon that queries job status periodically to determine if jobs executing licensed software instances are still running FIG. 4 depicts a flowchart showing operation of a license daemon responsible for checking the statuses of jobs having licensed software instances according to one embodiment of the present invention. In addition to verifying license usage, the license daemon may also be used by users or administrators to query available tokens for a given license, or report token availability for some or all licensed software managed by the daemon.

As shown, after the license daemon begins operation as in 410, the status of a specific known job is queried as in 420. If the job is still running as in 425, then the daemon will sleep a configurable time period, and then return to query the job status again as in 420. Once the job is recognized as not running as shown in 425, the license daemon will proceed with reconciling the number of tokens used for the job's software instances. This includes determining the number of nodes in node execution as in 440, and determining the number of CPUs and cores as in 450.

From the basis of the number of nodes and CPUs/cores executing the software as in 450, the license daemon may calculate the number of tokens utilized based on a predetermined usage formula for the specific executed application as in 460. Once the number of licenses per CPU/core/node is determined, the token count may be decremented as in 470. If no tokens are remaining after execution of this job as in 475, then the user will be alerted as in 480. Finally, the work of the license daemon for this specific job will end as in 490.

Further embodiments of the invention provide the ability to alert the user in real-time or near real-time settings with the license daemon, or automatically stop jobs and/or purchase more tokens if the number of tokens is zero or another predetermined number during software execution. The actions taken may be customized to only occur on a sliding scale, such as when only a specific percentage of tokens are remaining as compared to the size of the job, or actions may be taken simply when the number of tokens reaches some low number. Additionally, still further embodiments allow alerts to be customized or even presented on a real-time basis. Thus, a user might be presented with options to purchase more tokens immediately, cancel or modify a job, or take other interactive action.

Another further embodiment of the invention also enables the ability to "refund" or otherwise prevent consumption of one or more tokens upon the occurrence of some event or predefined criteria. For example, zero tokens may be consumed if a job fails or is terminated unexpectedly during execution in the MPP system. Or, consumption of fractions of a token might be ignored if the system is configured to measure or use fractions (such as if a test run is configured to only consume one-half of a token per instance).

Those of ordinary skill in the art would recognize that although the preceding examples reference large MPP-type computing systems, the licensing model described herein may also be applied to use within cloud computing environments. Independent software vendors face a significant problem of determining how to license their software in the cloud, where users are guaranteed resources, but not necessarily the same resource each time. Enhancements to the previous disclosed techniques may be added to support long-running applications (for example, for database servers). Further, the techniques of the present invention might be adapted to account for the resources consumed with micro charges per transaction (such as with every database transaction, for example) or for the number of hours that a job or software system is continuously running.

Even in the cloud, many of the existing licensing models (as described previously in this disclosure) do not fully map into the cloud. Further, applications executed in the cloud may not provide a simple ability to operate a licensing manager, or provide accurate measurements for resources used prior to execution. The various techniques of the present invention provide the ability to accurately measure the actual resource expenditures for licensed processes and software systems. Therefore, the size of a cloud may be able to expand and contract, while maintaining licensing pricing measurements and requirements for each processing node or unit.

As will also be appreciated by one of ordinary skill in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method for serving software licenses in a computer system, comprising:
    maintaining a plurality of license tokens within the computer system, the plurality of license tokens used for execution of licensed software instances in the computer system;
    tracking, with a token counter, a number of the plurality of license tokens remaining for use in the computer system;
    monitoring execution of a job in the computer system, the job including execution of one or more licensed software instances on the computer system, wherein the execution of each licensed software instance results in consumption of a predefined number of license tokens; and
    decrementing the token counter subsequent to execution of the job in the computer system, the token counter decremented for each successful execution of the one or more licensed software instances.

2. The method of claim 1, wherein the predefined number of license tokens consumed upon execution of each licensed software instance is one, and wherein the computer system is a parallel programming environment comprising a plurality of CPUs and cores.

3. The method of claim 1, further comprising calculating the number of licensed software instances executed in the job, including determining a number of CPUs and cores in the computer system executing the one or more licensed software instances.

4. The method of claim 1, further comprising verifying availability of at least one license token prior to execution of the job in the computer system.

5. The method of claim 1, further comprising alerting a user responsive to determining the token counter is zero.

6. The method of claim 1, wherein the job is allowed to complete execution in the computer system responsive to more license tokens being required for the execution of the licensed software instances than are available in the plurality of license tokens, and wherein the token counter records a negative balance for the number of tokens required in the job beyond those remaining in the plurality of license tokens.

* * * * *